No. 750,724. PATENTED JAN. 26, 1904.
C. O. STERLING.
CURLING IRON CASE.
APPLICATION FILED OCT. 13, 1902.
NO MODEL.
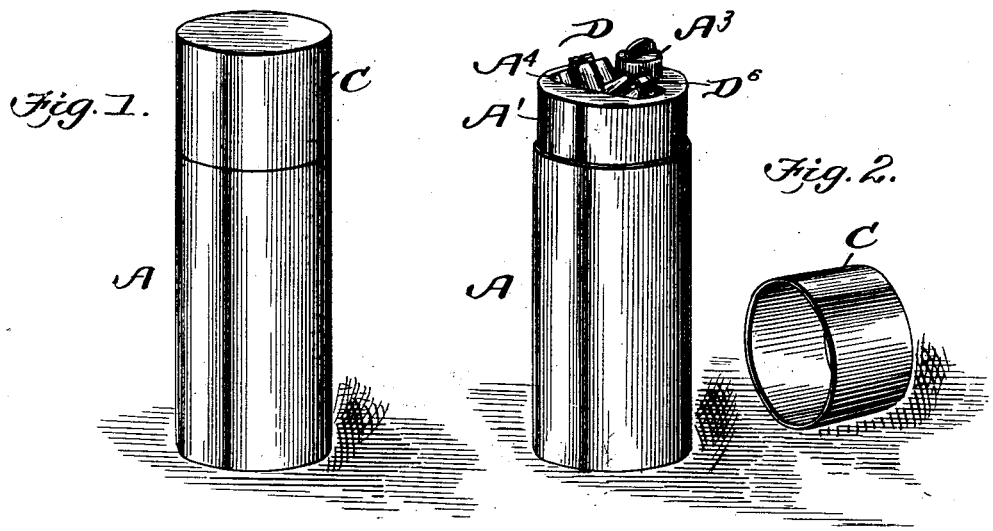
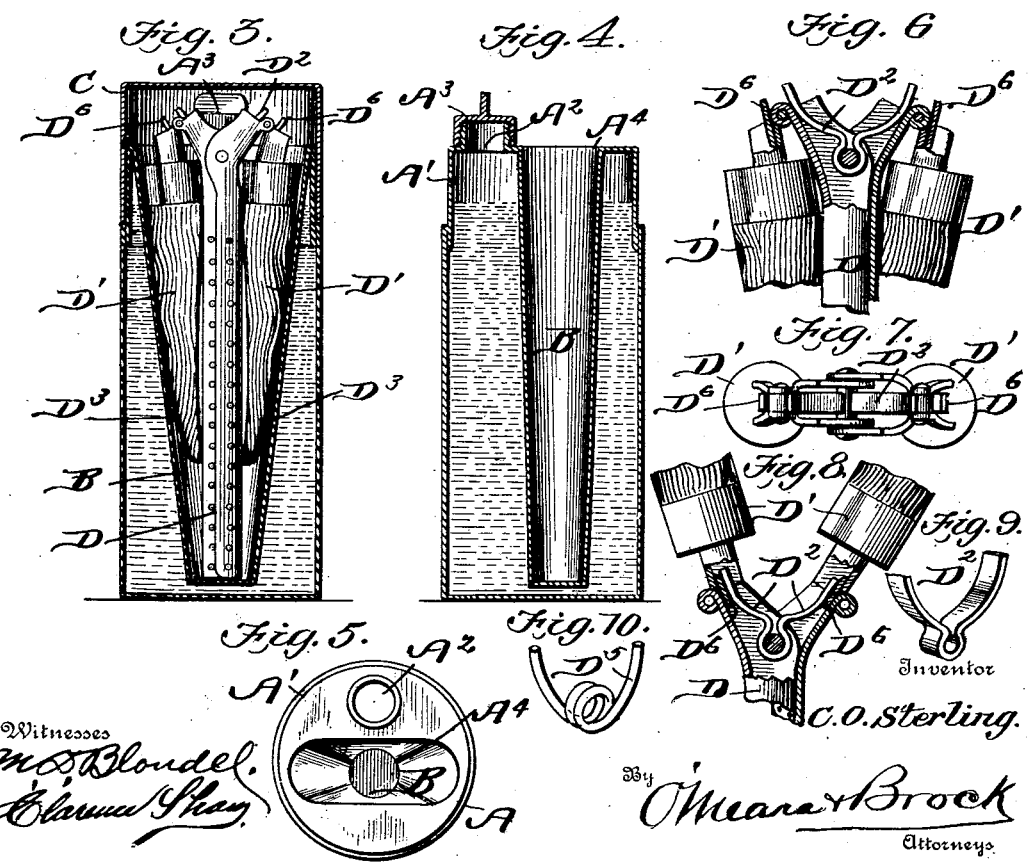

No. 750,724. Patented January 26, 1904.

UNITED STATES PATENT OFFICE.

CHARLES O. STERLING, OF WASHINGTON, DISTRICT OF COLUMBIA.

CURLING-IRON CASE.

SPECIFICATION forming part of Letters Patent No. 750,724, dated January 26, 1904.

Application filed October 13, 1902. Serial No. 127,107. (No model.)

*To all whom it may concern:*

Be it known that I, CHARLES O. STERLING, a citizen of the United States, residing at Washington, in the District of Columbia, have invented a new and useful Curling-Iron Case, of which the following is a specification.

This invention is an improved combination-case for curling-irons, the object being to provide an exceedingly simple and compact case for carrying the curling-irons and also the liquid fuel for heating said irons.

The invention also has for its object to provide a case particularly adapted for holding a pair of specially-constructed foldable curling-irons, thereby greatly reducing the size of the case and especially adapting it for travelers' use.

The invention consists, essentially, of a shell adapted to receive the alcohol or other liquid fuel, said shell being closed at the upper end, said closed end having an aperture which is normally closed by a screw-cap and an inner receptacle arranged within the shell, said inner receptacle being made tapering and widest at its upper end, said upper end being opened, said receptacle being adapted to receive and hold a pair of foldable curling-irons, and a cover adapted to fit upon the upper end of the shell and cover the upper end of the inner receptacle and the contents thereof.

The invention consists also in certain details of construction and novelties of combination, all of which will be fully described hereinafter, and pointed out in the claim.

In the drawings forming part of this specification, Figure 1 is a perspective view of the case with the cover arranged thereon. Fig. 2 is a perspective view of the case, together with the curling-irons arranged therein, the cover being removed. Fig. 3 is a vertical sectional view taken through the case with the cover thereon, foldable curling-irons being shown in elevation and arranged within the inner receptacle. Fig. 4 is a vertical sectional view taken through the case on a plane substantially at right angles to the sections shown in Fig. 3. Fig. 5 is a top plan view of the case, the screw-cap being removed. Fig. 6 is a detail sectional view showing the foldable connection between the handles and irons of the curling-iron. Fig. 7 is a top plan view of such connection. Fig. 8 is a detail sectional view, partly in elevation, the handles being opened. Figs. 9 and 10 show different constructions of springs employed for holding the irons together and also for locking the pivotal case between the irons and handles.

In the practical embodiment of my invention I employ a shell A, which in the present instance is shown cylindrical in form; but it will of course be understood that this shell may be of any desired shape and can be constructed of any suitable material. The upper end of the shell is preferably shouldered and contracted or of a less diameter than the main or body portion. One method of accomplishing this is by means of a closure A', which is preferably brazed or soldered in the upper end of the shell; but the said closure may be connected in any suitable manner. The top of the closure is provided with an eccentrically-located small circular aperture $A^2$, which is provided with a threaded collar, upon which the screw-cap $A^3$ is secured for the purpose of normally closing the aperture. The shell A is intended to receive wood-alcohol or other liquid fuel, and when it is desired to heat the curling-irons the irons proper are inserted through the aperture $A^2$ for the purpose of absorbing a definite quantity of liquid fuel, it being understood that one member of the curling-irons is tubular in form, perforated, and filled with asbestos or similar non-combustible absorbent material, and after a definite quantity of the liquid fuel has been absorbed the irons are withdrawn from the case and the fuel lighted, and while the said fuel is being consumed the curling-irons will become properly heated. The top of the closure is further provided with an elongated elliptical-shaped opening $A^4$, which is arranged or located with its longest diameter substantially diametrically across the top or a trifle to one side of the center, away from the opening $A^2$. Secured in this opening at its upper end is an inner case or receptacle B, which is preferably elliptical in cross-section at all points of its length, the bottom of the case extending nearly to the bottom of the outer case. Said case tapers from its upper to its lower end, the sides or walls at the ends of the longest diameter of the ellipse tapering considerably more than the other or side walls, which are substantially flat and parallel. This form of inner case gives the greatest amount of room within the outer case for the heating fluid and at the same time makes it peculiarly adapted to receive a specially-constructed pair of curling-irons in which the handles are made tapering and adapted to be folded against the irons, so that when the handles are folded the irons can be inserted in the receptacle B and only a very small portion thereof will project above the upper end of said receptacle and case, as most clearly shown in Figs. 2 and 3. The length or depth of the inner case B is such that when the irons are inserted the tip will preferably rest on the bottom of the case and the joints of the handles will project slightly above the top of the closure, or substantially even with the top of the cap $A^3$, so that they can be readily grasped for the purpose of removal. By making the outer case of such a diameter that the longest diameter of the elliptical-shaped opening of the inner case will extend almost across the top of the closure and giving the walls of the case such a taper or incline as to engage with the handles of the irons the size of the outer case can be made of the smallest size possible, and the irons will be held in the inner case without liability of their shaking about and rattling, and the top of the cap for the outer case can be slipped down almost into engagement with the joint portion of the irons and yet not interfere with the top of the cap $A^3$. After the curling-irons have been folded and placed within the receptacle a cover C is arranged upon the case, completely covering the irons and making an exceedingly neat, compact, and tight package, which can be packed away in the valise without damaging any of the contents thereof, as it will be readily understood that the screw-cap $A^3$ will prevent the escape of any of the liquid fuel. Curling-irons comprise the irons proper, D, to which the handles D' are hinged. A spring $D^2$ is arranged between the irons proper for the purpose of normally holding them together, and the free ends of this spring also bear against a portion of the hinge connected to the handles for the purpose of holding the handles in their proper positions after they have been opened. The handles are made tapering toward their outer ends, as most clearly shown at $D^3$, so that the said handles can be folded close against the irons, as most clearly indicated in Fig. 3, for the purpose of inserting them in the receptacle B, and in Figs. 9 and 10 I have shown different forms of springs $D^2$ and $D^5$, which can be employed for the purpose of holding the irons together and also locking the handles in their proper positions.

It will be noted that the handles are each provided with a small plate or lug $D^6$, which bears against the free end of the spring when the handles are opened.

It will thus be seen that I provide a novel construction of curling-iron especially adapted for use in connection with a case, which is also of special formation, for the purpose of not only carrying the said irons, but also the liquid fuel for heating the same, and by having the handles foldably connected to the irons I am enabled to gradually reduce the size of the case, thereby rendering it especially adapted for travelers' use.

Having thus fully described my invention, what I claim as new, and desire to secure by Letters Patent, is—

A curling-iron case comprising an outer case, the upper end of which is contracted and shouldered and provided with a closure having two openings therein, one of which openings is eccentrically located and the other one is elliptical in cross-section, the longest diameter of the elliptical opening being almost as great as the diameter of the case and located a trifle to one side of the center of the case away from the other opening, a removable stopper in the eccentrically-located opening, a tapering case secured in the elliptical opening with its lower end closed and at a short distance from the bottom of the outer case, the side walls of said inner case being substantially flat and nearly parallel and the end walls being of a greater taper than the side walls, and a cap for the upper reduced end of the outer case.

CHARLES O. STERLING.

Witnesses:
CHAS. E. BROCK,
M. D. BLONDEL.